(12) United States Patent
Lee et al.

(10) Patent No.: US 10,624,019 B2
(45) Date of Patent: Apr. 14, 2020

(54) WIRELESS TRANSCEIVER SYSTEM

(71) Applicants: Hyungkoo Lee, Tustin, CA (US);
Frank Jeffrey Jungman, Escondido, CA (US)

(72) Inventors: Hyungkoo Lee, Tustin, CA (US);
Frank Jeffrey Jungman, Escondido, CA (US)

( * ) Notice: Subject to any disclaimer, the term of this patent is extended or adjusted under 35 U.S.C. 154(b) by 0 days.

(21) Appl. No.: 15/252,118

(22) Filed: Aug. 30, 2016

(65) Prior Publication Data

US 2018/0063769 A1    Mar. 1, 2018

(51) Int. Cl.
| | | |
|---|---|---|
| *H04W 40/24* | (2009.01) | |
| *H04W 4/80* | (2018.01) | |
| *H04M 1/725* | (2006.01) | |
| *H04W 4/00* | (2018.01) | |
| *H04W 4/02* | (2018.01) | |

(52) U.S. Cl.
CPC ......... *H04W 40/24* (2013.01); *H04M 1/7253* (2013.01); *H04W 4/00* (2013.01); *H04W 4/80* (2018.02); *H04W 4/02* (2013.01)

(58) Field of Classification Search
CPC .. H04B 1/3855; H04B 1/3877; H04B 1/3883; H04W 4/008; H04W 40/24; G06F 1/1615; G06F 1/1632; G06F 13/102; G06F 13/385; H02J 7/0044; H02J 7/0045; H04N 5/2253; H04M 1/7253
See application file for complete search history.

(56) References Cited

U.S. PATENT DOCUMENTS

| | | | | |
|---|---|---|---|---|
| 6,981,148 | B1 * | 12/2005 | Jim | H04L 63/102 |
| | | | | 707/999.003 |
| 8,646,060 | B1 * | 2/2014 | Ben Ayed | H04L 63/0853 |
| | | | | 726/9 |
| 8,700,090 | B2 * | 4/2014 | Llanos | H04M 1/72527 |
| | | | | 455/41.2 |
| 9,319,501 | B2 * | 4/2016 | Huang | H04M 1/0283 |
| 9,462,469 | B2 * | 10/2016 | Hillyard | H04W 12/06 |
| 9,679,177 | B2 * | 6/2017 | Deal | G06K 7/10821 |
| 9,736,281 | B2 * | 8/2017 | Holden | H04M 1/0254 |
| 9,804,636 | B2 * | 10/2017 | Barnett | G06F 1/1632 |
| 9,827,494 | B2 * | 11/2017 | Motoishi | A63F 13/54 |
| 9,831,695 | B2 * | 11/2017 | Pickens | H02J 7/0044 |
| 2005/0101309 | A1 * | 5/2005 | Croome | G06F 9/445 |
| | | | | 455/418 |

(Continued)

*Primary Examiner* — Kashif Siddiqui
(74) *Attorney, Agent, or Firm* — Louis F. Teran

(57) ABSTRACT

The present invention relates to a wireless transceiver system that removably connects to a device, such as a camera, to allow transmission of data therefrom through a network. The wireless transceiver system of the present invention comprises a module, a cradle, and an application accessory. The application accessory is a device into which the cradle is permanently and electronically connected. The application accessory can be a digital camera, a cellular phone, a portable computer, an MP3 player, a television, a watch, or any electronic device that can be connected to a network through a communication device in the module. The module is removably connected to the cradle. This allows the module to serve as a removable communication device that can be shared by multiple application accessories. In addition, the module can serve to lock out unauthorized users from using a specific application accessory.

10 Claims, 5 Drawing Sheets

(56) References Cited

U.S. PATENT DOCUMENTS

| | | | | |
|---|---|---|---|---|
| 2006/0206722 | A1* | 9/2006 | Zhang | G06F 21/32 713/186 |
| 2006/0291483 | A1* | 12/2006 | Sela | H04L 12/66 370/401 |
| 2007/0167190 | A1* | 7/2007 | Moosavi | H04M 1/04 455/557 |
| 2007/0287507 | A1* | 12/2007 | Aton | H04M 19/04 455/567 |
| 2009/0134973 | A1* | 5/2009 | Sandler | G06F 21/85 340/10.1 |
| 2009/0276475 | A1* | 11/2009 | Ramsey | H04L 63/083 |
| 2010/0114662 | A1* | 5/2010 | Jung | G06Q 10/10 705/35 |
| 2010/0228428 | A1* | 9/2010 | Harshbarger | G07C 5/008 701/31.4 |
| 2010/0233961 | A1* | 9/2010 | Holden | G06F 13/385 455/41.3 |
| 2011/0039518 | A1* | 2/2011 | Maria | H04L 12/66 455/406 |
| 2011/0169924 | A1* | 7/2011 | Haisty | H04N 9/3147 348/51 |
| 2012/0167232 | A1* | 6/2012 | Moosavi | G06F 21/44 726/29 |
| 2013/0053097 | A1* | 2/2013 | Phillips | H04M 1/72527 455/556.1 |
| 2013/0277529 | A1* | 10/2013 | Bolliger | F16M 11/10 248/676 |
| 2014/0025537 | A1* | 1/2014 | Venkataramu | G06Q 30/0621 705/26.61 |
| 2014/0075051 | A1* | 3/2014 | Zadesky | G06F 13/122 710/3 |
| 2014/0223531 | A1* | 8/2014 | Outwater | H04L 63/0861 726/7 |
| 2014/0256437 | A1* | 9/2014 | Rom | A63F 13/35 463/36 |
| 2014/0317303 | A1* | 10/2014 | Toprani | H04L 65/1003 709/227 |
| 2015/0016035 | A1* | 1/2015 | Tussy | G06F 1/163 361/679.03 |
| 2015/0121471 | A1* | 4/2015 | Kunjukrishnan | H04W 12/08 726/4 |
| 2015/0354793 | A1* | 12/2015 | Huang | G03B 15/02 362/6 |
| 2016/0093130 | A1* | 3/2016 | Shen | H04W 4/80 340/5.61 |
| 2016/0140372 | A1* | 5/2016 | Deal | G06K 7/10821 235/462.15 |
| 2016/0231789 | A1* | 8/2016 | Laine | G06F 1/1632 |
| 2016/0255531 | A1* | 9/2016 | Stein | G06F 1/1632 455/575.1 |
| 2017/0004340 | A1* | 1/2017 | Powell | G06K 7/0004 |
| 2017/0047764 | A1* | 2/2017 | Lee | H02J 7/0042 |
| 2017/0094597 | A1* | 3/2017 | Su | H04W 52/0209 |
| 2017/0187710 | A1* | 6/2017 | Outwater | H04L 63/0861 |
| 2017/0193207 | A1* | 7/2017 | Ashley | G06F 21/32 |
| 2017/0201942 | A1* | 7/2017 | Mathews | H04W 52/0216 |
| 2017/0236109 | A1* | 8/2017 | Pignal | G06Q 20/206 705/18 |
| 2017/0324581 | A1* | 11/2017 | Hall | H04B 1/713 |
| 2017/0344121 | A1* | 11/2017 | Blanco | H04W 76/10 |

* cited by examiner

WIRELESS TRANSCEIVER SYSTEM

BACKGROUND OF THE INVENTION

Field of the Invention

The present invention relates generally to a field of communication device or modem that transmits data through a network. More specifically, the invention relates to wireless transceiver system that removably connects to a device, such as a camera, to allow transmission of data therefrom through a network.

Description of the Prior Art

The demand for electronic devices that can transmit and receive data through a network has dramatically increased over the years. Initially, cellular phones were the natural category of devices that can transmit and receive data through a network. However, in recent years, the public's appetite for devices, other than cellular phones, that can transmit and receive data has increased exponentially. There is a large demand for devices, such as cameras, MP3 players, watches, televisions, portable computers, and other devices that can transmit and receive data through a network. For example, there is a demand for a digital camera that can take pictures and transmit said pictures to others. Another example, there is a demand for televisions that can receive streaming data of movies or television shows through a network.

Such demand is currently being met by electronic devices that have a communications device or modem built-in. However, the communication devices or modems that are built into said electronic devices continually change and improve. Thus, for example, a digital camera may become outdated rapidly because the communication device or modem cannot be updated since it is built-in. Furthermore, the manufacturers of digital camera, for example, are not experts in the communication devices or modems that are incorporated into the camera. Thus, Development of a camera with a built-in modem is very costly and requires a substantial amount of research and development more than a regular camera.

Furthermore, once the camera with a built-in modem is developed, the modem has to be configured to meet that varying and rigorous standards of the providers of a network. Such providers are very sensitive and selective as to what devices they allow to transmit data through their networks. Thus, the various network providers require any device that will transmit through their network to undergo numerous tests to ensure that the device is compatible with their network. Different network providers have different networks and, thus, different testing parameters. The numerous tests required by the various network providers are very costly and time consuming for the manufacturer of the devices.

The wireless transceiver system of the present invention transfers the burden of testing away from the device manufacturer. Instead, the present invention comprises a module that is removably connected to a device. The module comprises a communication module or modem that allows the device to transmit and receive data through a cellular network. Thus, with the present invention, the modem is no longer built into the device, rather the modem is removably connected to the device. The manufacturer of the present invention would bear the burden of testing the module of the present invention for compatibility of each of the network providers.

In addition, when the modem is built into the device, the modem in the device is configured to be associated with the network account of the owner of the device. Thus, when the owner lends the device to a friend, the friend can transmit data with the device through a network using the owner's account. However, the present invention allows for the module or modem to be removably attached to the device. Thus, each module is associated with the network account of the owner of the module rather than the owner of the device. Thus, if the owner of the device lends the device to a friend, the friend attaches his module to the device and can then transmit data from the device under his own account, rather than the account of the device's owner.

Furthermore, a device that has a modem built-in cannot grant or deny permission to various users. In essence, such a device would be usable and accessible by any person that has physical possession thereof. This is problematic as it cannot lock out persons from using the device. The present invention, however, solves this problem by taking advantage that the module can be removably attached to the device and that the module is linked to the account of the module's owner. Before using the device, in the present invention, the module must first be removably attached. Upon attaching the module, the device checks whether the module's owner has permission to use the device. If not, then the device locks itself down to prevent its use.

Thus, based on the increased demand for devices that can transmit data through networks, a heretofore unaddressed need exists for a wireless transceiver system that can be removably connected to multitude of devices for use and to allow transmission of data therefrom.

SUMMARY OF THE INVENTION

Accordingly, the present invention has been made in view of the above-mentioned disadvantages occurring in the prior art. The present invention is a wireless transceiver system that comprises a module or modem that can be removably connected to a multitude of application accessories or devices.

It is therefore a primary objective of the present invention to allow for a modem or module to be removably connected to an application accessory or device so as to allow transmission of data through a network.

A further objective of the present invention is to allow the connection of the module to the application accessory to be robust.

A further objective of the present invention is to incorporate a cradle into the application accessory into which the module can be connected.

A further objective of the present invention is to allow the module to be powered by the battery of the application accessory rather than its own battery.

A yet further objective of the present invention is to allow the module to interface with the software in the application accessory to recognize the user so as to grant or deny permission to use.

The above objects and other features of the present invention, as well as the structure and operation of various embodiments of the present invention, are described in detail below and with reference to the accompanying drawings.

DESCRIPTION OF THE DRAWINGS

The accompanying drawings which are incorporated by reference herein and form part of the specification, illustrate various embodiments of the present invention and, together with the description, further serve the explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Reference will now be made to the drawings in which various elements of the present invention will be given numerical designations and in which the invention will be discussed so as to enable one skilled in the art to make and use the invention.

Figure 1:
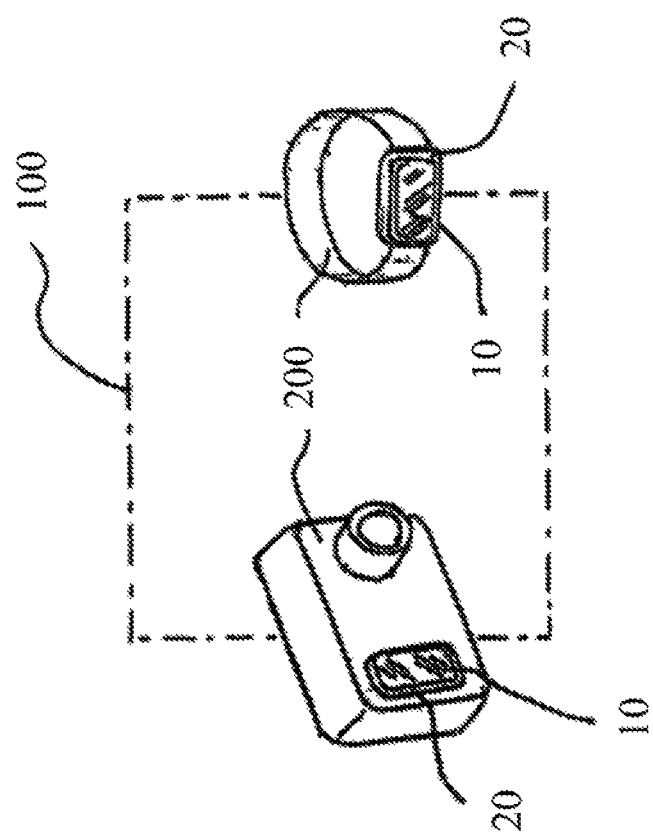
FIG. 1 is a perspective view of the wireless transceiver system of the present invention in its assembled state as it would be attached and used with an application accessory.
Figure 2:
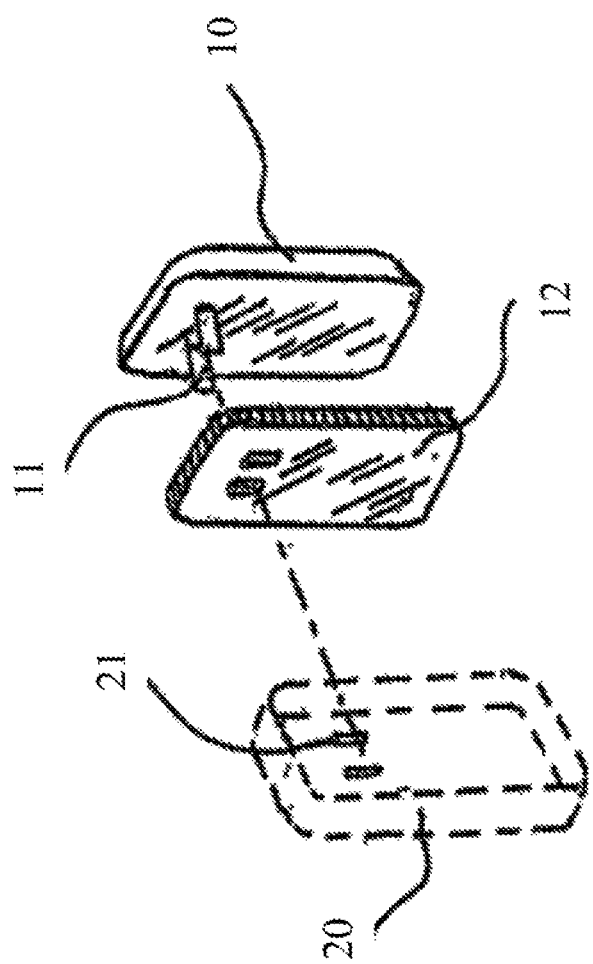
FIG. 2 is an exploded view of the wireless transceiver system of the present invention and the application accessory.

The wireless transceiver system 100 of the present invention comprises a module 10, a cradle 20, and an application accessory 200. FIG. 1 shows a perspective view of the wireless transceiver system 100 of the present invention in its assembled state as it would be used with an application accessory 200. FIG. 2 shows an exploded view of the wireless transceiver system 100 of the present invention to depict in greater detail the various components that comprise the present invention.

Figures 3A, 3B:
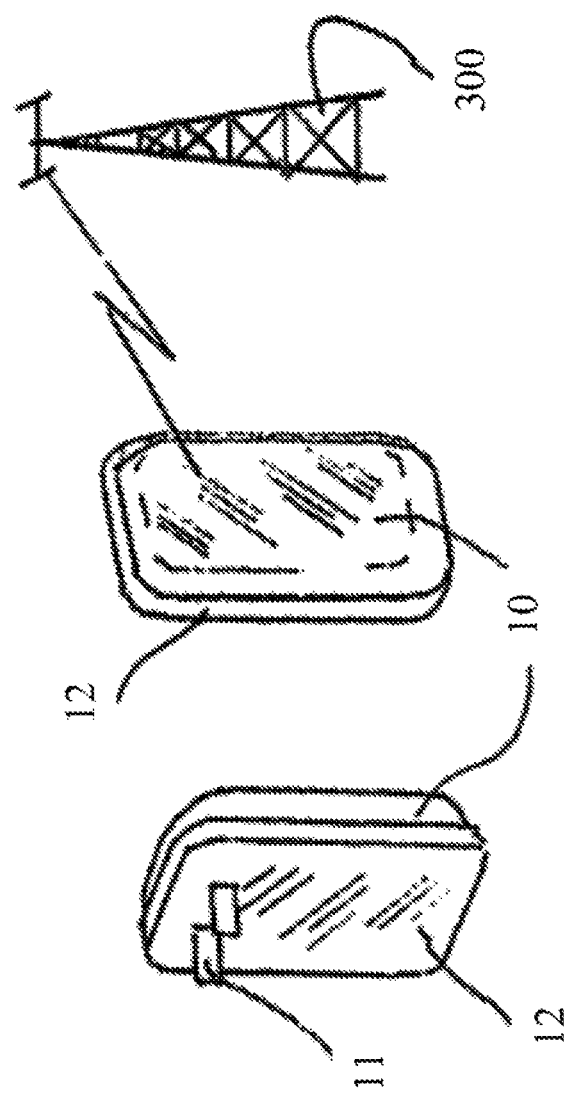
FIGS. 3a and 3b are perspective views of the wireless transceiver module of the present invention.

FIGS. 3a and 3b show perspective views of the module 10 that resembles a Chiclet™ chewing gum. The module 10 comprises a small plastic capsule that encapsulates a communications device 12 and other electronic components that induce the operation and functionality of the present invention. The underside of the module 10 has a plurality of small metallic contacts 11 that protrude from the plastic capsule. Said metallic contacts 11 allow connectivity between the module 10 and the cradle 20 as explained in greater detail below.

Figures 4A, 4B:
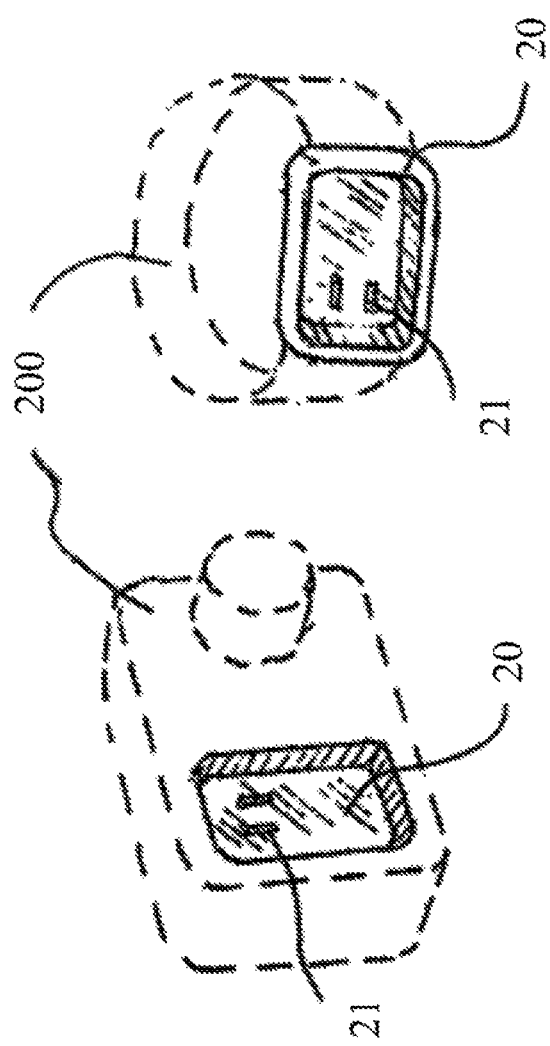
FIGS. 4a and 4b are perspective views of the cradle of the present invention.

FIGS. 4a and 4b show perspective views of the cradle 20 which is designed to mate with the module 10, as shown in FIG. 1. Similar to the module 10, the cradle 20 is made of plastic material and contains a plurality of small metallic contacts 21 that protrude from the plastic. Said metallic contacts 21 become physically in contact with the metallic contacts 11 in the module 10 so as to allow electronic connectivity between the module 10 and the cradle 20.

The cradle 20 is incorporated into the application accessory 200. The application accessory 200 is a device into which the cradle 20 is permanently and electronically connected. The application accessory 200 can be a digital camera, a cellular phone, a portable computer, an MP3 player, a television, a watch, or any electronic device that can be connected to a network 300 through the communications device 12.

Figure 5:
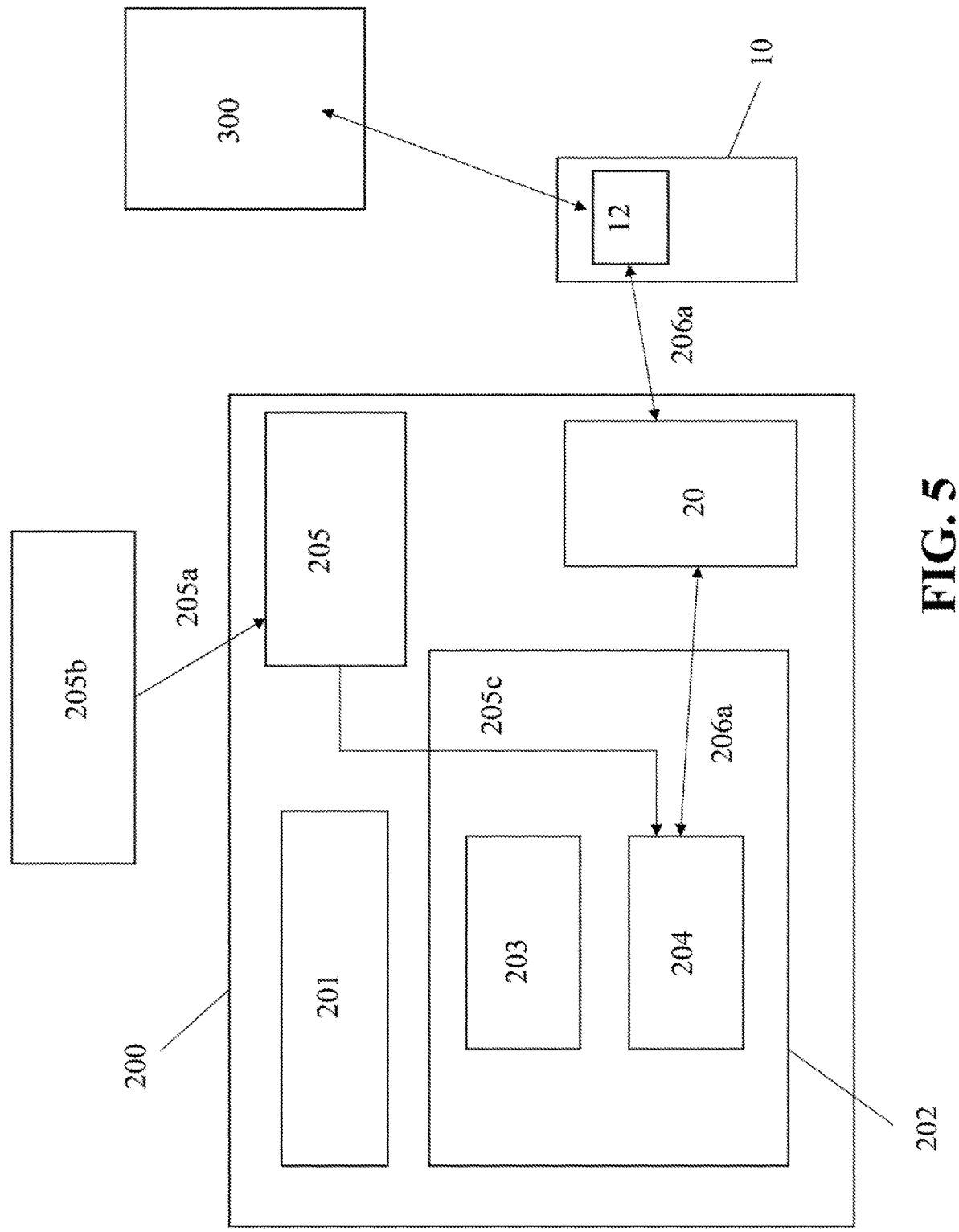
FIG. 5 is a block diagram illustrating a wireless transceiver system in accordance with the preferred embodiment of the present invention.

In addition to the cradle 20, the application accessory 200 also comprises a battery 201, a computer memory 202, a local database 203, a data manager 204, and a sensor 205, as shown in FIG. 5.

The sensor 205 within the application accessory 200 is configured to determine the location of the application accessory 200 relative to a predetermined reference point. For example, in the preferred embodiment, sensor 205 is a global positioning system (GPS) sensor coupled to the application accessory 200, although other types of positioning systems and/or sensors are also possible. The sensor 205 is configured to receive signals 205a from a plurality of GPS satellites 205b and, as known in the art, sensor 205 is designed to analyze said signals 205a in order to determine the sensor's coordinate values relative to a predetermined reference point. In addition, sensor 205 is designed to transmit a signal 205c to the data manager 204 indicating the application accessory's 200 current coordinate values. The data manager 204 is configured to receive signal 205c and to monitor the location of the application accessory 200 over time by processing multiple signals 205c. The data manager 204 can be implemented in software, hardware, or a combination thereof. In the preferred embodiment, the data manager 204 is implemented in software and stored in the computer memory 202.

In a similar fashion, the application accessory 200 is capable of generating data that are then transmitted to the data manager 204. Such data can be an image from a camera, an audio file from an MP3 player, a data file from a portable computer, and more. Once the data is in the data manager 204, it can be transmitted to the network 300 through the communications device 12 in the module 10.

The data manager 204 is configured to transmit data via signal 206a to the communications device 12 which is capable of transmitting and receiving data to and from devices outside of the module 10. In this regard, communications device 12 is preferably a modem configured to transmit and receive wireless signals to and from a network 300.

The data is transmitted via signal 206a to the communications device 12 through the metallic contacts 21 in the cradle 20 that are physically in contact with the metallic contacts 11 in the module 10. Additionally, the battery 201 is also electrically connected to the module 10 through said metallic contacts 11 and 21 so as to power and operate the circuitry in the module 10.

Upon mating the module 10 to the cradle 20 in the application accessory 200, initializing data is first transmitted to the communications device 12 through the metallic contacts 21 in the cradle 20 that are physically in contact with the metallic contacts 11 in the module 10. The initializing data includes information specific to the application accessory 200. Some of said information is the data speed, latency, and amount of data the application accessory 200 will likely require to be transmitted through the network. After the initializing data is transmitted to the communications device 12, it is then transmitted to the network provider. This allows the network provider to allocate the proper network resources to the application accessory 200. First, the network provider uses the initializing data to determine the compatibility of the application accessory to one of its networks. Generally, network providers are sensitive and selective as to what devices they allow to transmit data through their networks. Different network providers have different compatibility testing parameters for each of their networks. Once a network provider determines compatibility of the application accessory to one of its networks, it then allocates network resources within said network to create a connection between said network and the application accessory.

In addition to transmitting and receiving data, the module 10 of the present invention also facilitates authentication of the user so as to exclude unauthorized users. Such authentication applies to cases in which restricted access to the application accessory 200 is needed. The process of authenticating the user begins when the module 10 is mated with the cradle 20 attached to the application accessory 200. The module 10 comprises a module database in which the credentials for the user are stored. When the module 10 is mated with the cradle 20 attached to an application accessory 200, the data manager 204 retrieves the credentials for the user from the module database and compares it to the list of credentials stored in the local database 203 within the application accessory 200. If the user credentials are found in the local database 203, the application accessory 200 is unlocked with any applicable restrictions. In essence, the user is granted access to the application accessory 200. Such access is granted with any applicable restrictions and the details, including time and location, of such granting of access is recorded in the local database 203.

If, however, the credentials of the user are not found in the local database 203, then the present invention 100 utilizes the communications device 12 to retrieve an updated list of credentials from a remote location through the network 300. If the credentials of the user are then in the updated list, then access to the application accessory is granted 200. Otherwise, access is denied and details of the incident is recorded in the local database 203.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. A wireless transceiver system comprising:
   a module encapsulating a communications device electrically connected to a first plurality of contacts made of conductive material;
   a cradle having a second plurality of contacts made of conductive material;
   an application accessory to which said cradle is attached and having a data manager;
   wherein said module can be removably attached to said cradle such that said module and said cradle are electrically connected through said first and second contacts;
   wherein said application accessory stores data in said data manager, including initializing data;
   wherein said data manager transmits said initializing data to said communications device;
   wherein said initializing data is transmitted to a network provider by said communications device;
   wherein said network provider uses said initializing data to determine the compatibility of said application accessory to a network then allocates network resources within said network;
   wherein, once said network resources are allocated, said data manager transmits data to said communications device through said first and second contacts; and
   wherein said data is transmitted by said communications device to said network having said allocated network resources.

2. The wireless transceiver system of claim 1 further comprising a battery encapsulated within said application accessory that powers said module when said module is removably attached to said cradle, and a sensor encapsulated within said application accessory that determines location data of said application accessory that is transmitted to said network through said communications device.

3. The wireless transceiver system of claim 1 further comprising a local database in said application accessory and in which identification of authorized users is stored; wherein said application accessory is locked; and wherein a user identification in said module must match said identification of authorized users in said local database prior to said application accessory being unlocked.

4. The wireless transceiver system of claim 3 wherein said communications device retrieves an updated list of authorized users from said network prior to unlocking said application accessory when said user identification in said module does not match said identification of authorized users in said local database.

5. A wireless transceiver comprising:
   means of removably and electrically attaching a communications device in a module to an application accessory;
   means of supplying power to said communications device from a battery located within said application accessory;
   means of storing data from said application accessory to a data manager, including initializing data;
   means of transmitting said initializing data to a network provider through said communications device;
   means for said network provider to determine the compatibility of said application accessory to a network then allocating network resources within said network based on said initializing data; and
   means of transmitting said data to said network through said communications device once said network resources are allocated.

6. The wireless transceiver of claim 5 further comprising means of locking said application accessory; means of storing identification of authorized users in a local database; means of comparing a user identification in said module to said identification of authorized users in said local database; and means of unlocking said application accessory when said user identification in said module matches said identification of authorized users in said local database.

7. The wireless transceiver of claim 6 further comprising means of retrieving an updated list of authorized users from said network prior to unlocking said application accessory when said user identification in said module does not match said identification of authorized users in said local database.

8. A method of transmitting data with a wireless transceiver comprising the steps of:
   electrically and removably connecting a communications device to an application accessory;
   storing data from said application accessory in a data manager, including initializing data;
   determining the compatibility of said application accessory to a network;
   allocating network resources within said network based on said initializing data;
   transmitting said data from said data manager to said network having said allocated network resources through said communications device; and
   powering said communications device by a battery encapsulated within said application accessory.

9. The method of transmitting data with a wireless transceiver of claim 8 further comprising the steps of comparing a user identification in said module to identification of authorized users in said local database prior to said application accessory unlocks said wireless transceiver.

10. The method of transmitting data with a wireless transceiver of claim 9 further comprising the steps of updating said identification of authorized users prior to unlocking said application accessory when said user identification in said module does not match said identification of authorized users in said local database.

\* \* \* \* \*